Dec. 25, 1956 J. H. GARDNER ET AL 2,775,601
NON-CATALYTIC VAPOR PHASE OXIDATION OF ETHANE
Filed Nov. 17, 1952
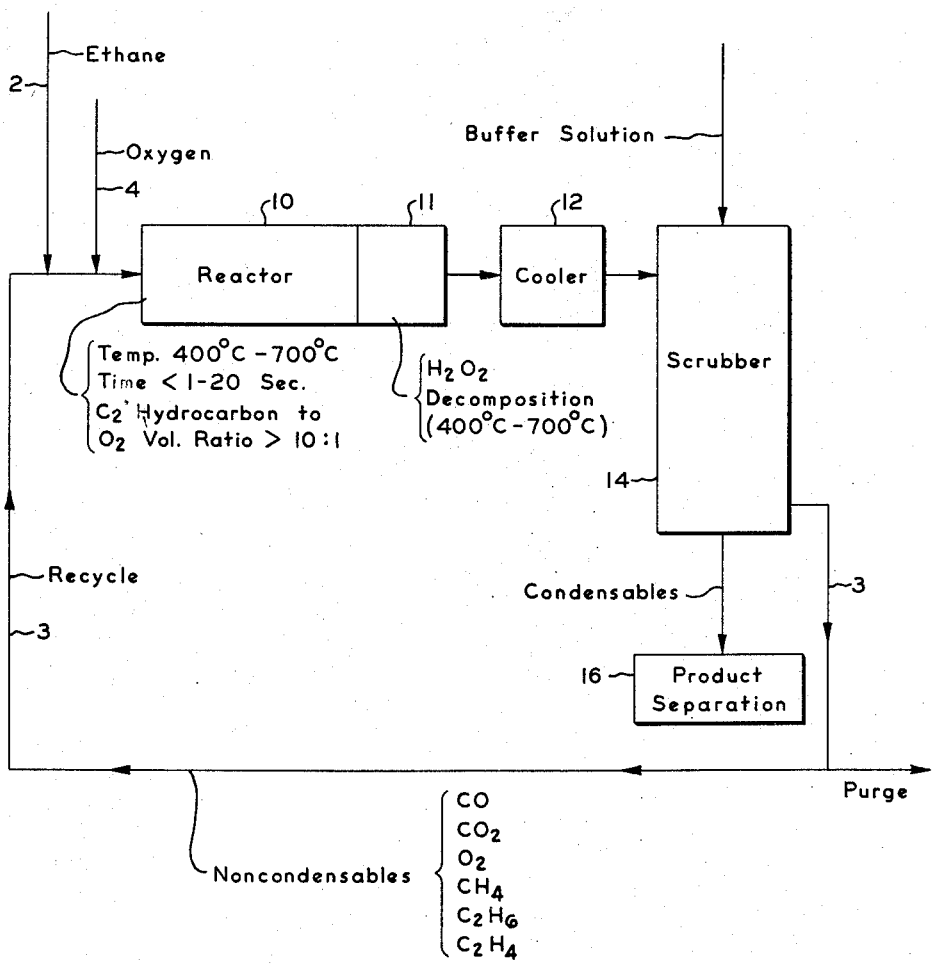
INVENTORS
JAMES H. GARDNER
NAT C. ROBERTSON
BY ERWIN F. SCHOENBRUNN
ATTORNEY

United States Patent Office 2,775,601
Patented Dec. 25, 1956

2,775,601

NON-CATALYTIC VAPOR PHASE OXIDATION OF ETHANE

James H. Gardner and Nat C. Robertson, Cambridge, and Erwin F. Schoenbrunn, Needham Heights, Mass., assignors to National Research Corporation, Cambridge, Mass., a corporation of Massachusetts Application November 17, 1952, Serial No. 320,954

4 Claims. (Cl. 260—348.5)

In the past much work has been focused on the direct oxidation of ethane and other saturated hydrocarbons to produce useful oxygenated compounds. For the most part these oxidations were carried out under superatmospheric pressure and in the presence of oxidation catalysts. The oxygenated products obtained from such reactions were mainly aldehydes, ketones, acids and alcohols.

In more recent years, ethylene oxide has become of tremendous importance and numerous methods have been devised to produce it commercially. The most important methods for producing this product today all involve ethylene as a starting material.

Accordingly, a principal object of the present invention is to provide a novel method of producing good yields of ethylene oxide directly from ethane.

Another object of this invention is to provide a process for the direct oxidation of ethane with oxygen in the vapor phase at pressures slightly in excess of atmospheric pressure and in the absence of expensive catalysts and without requiring the consumption of expensive reagents.

Still another object of this invention is to perform the direct oxidation of ethane using a recycle system which is particularly adaptable to a continuous commercial process.

Other objects of the invention will in part be obvious and will in part appear hereinafter.

The invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention, reference should be had to the following detailed description taken in connection with the accompanying drawing which is a schematic flow sheet illustrating one embodiment of the invention.

In the present invention, ethane is oxidized at low pressures (on the order of about 15 p. s. i. to about 100 p. s. i. absolute) without the use of catalysts. This is achieved at a high flow rate of the reactant gases through the reactor and with excellent yields of the desired product ethylene oxide. Oxygen is used as the source of oxygen for the oxidation reaction, and a large volume of recycle gas containing $C_2$ hydrocarbons is fed to the reactor with the make-up ethane and oxygen to provide, at all times in the reactor, a high ratio of $C_2$ hydrocarbons to oxygen. This ratio, which can be expressed as the volume (or molar) ratio of $C_2$ hydrocarbons to oxygen, is at least above 10 and is preferably on the order of about 15. The temperature in the reactor is maintained between about 400° C. and about 700° C., the preferred temperature range being between about 500° C. and 600° C. Excellent yields have been obtained at temperatures on the order of 580° C.

The oxidation reaction is preferably carried out so that only about 35% to 75% of the oxygen fed to the reactor is consumed during the passage of the reactant gases therethrough. Measurement of the residual oxygen in the outgasses is consequently utilized as an excellent method of controlling the velocity and thereby the time during which the reactant gases remain in the reaction zone. As a general proposition, this time is short, on the order of from about a fraction of a second to about twenty seconds. Preferred embodiments of the invention contemplate the use of very short times, on the order of from about one second to about three seconds.

The relationship of the various steps of the process and the types of equipment employed therewith are best illustrated by a consideration of the accompanying drawing wherein an ethane supply is indicated at 2. Ethane, drawn from this supply 2, is mixed with large quantities of recycle gas from the pipe 3. Oxygen, drawn from a supply 4, is then mixed with the ethane-recycle gas mixture so as to achieve a volume ratio of $C_2$ hydrocarbons to oxygen of about 10. The resulting mixture (now composed of ethane, oxygen, and recycle gas) is passed into the reactor 10. The reactor 10 is maintained at a temperature between 400° C. to 700° C. and at a pressure slightly in excess of atmospheric. The gas mixture is passed through the reactor 10 for a period of time from about a fraction of a second to about 20 seconds. The gas mixture leaving the reactor 10 is passed through a hydrogen peroxide decomposition chamber 11 to a cooler 12 and thence to a scrubber 14 wherein the condensable products are separated from the noncondensables. The noncondensable gases are divided into two streams. One stream is recycled to be mixed with fresh quantities of ethane and oxygen and the other stream is purged. The condensables, or oxygenated products, are fed from the scrubber 14 to a separation unit 16 wherein the mixture is separated into its individual components comprising ethylene oxide, formaldehyde and acetaldehyde. A more detailed description of moderate pressure ethane oxidation is given in the following nonlimiting example.

Example 1

One volume of ethane and 0.75 volume of oxygen are mixed with about 23 volumes of recycle uncondensable gases. The gas mixture is passed through a heated unpacked reactor in the absence of catalysts and at a pressure slightly in excess of atmospheric pressure. This reactor is a cylindrical Vycor tube having a diameter of 1.66 cm. and a length of 83 cm. The walls of the reactor are heated to about 580° C. The contact time of the gaseous mixture in this heated reactor is approximately 1.5 seconds. The hot gas mixture leaving the reactor is passed over a bed (at 11) consisting of inactive alumina pellets (at essentially the reactor temperature) to decompose the bulk of the hydrogen peroxide present to prevent oxidation of the valuable product by $H_2O_2$ in the scrubber. The gas mixture is then cooled by bubbling through a small amount of a buffered cold water solution and then scrubbed by passage up through a plate column. Phosphate buffer solution (pH 6), cooled to 0° C., is passed down the column at a rate of 0.08 volume of solution per standard volume of gas. The uncondensable gases which come from the column are divided into two streams. One is used to furnish the 23 volumes of recycle uncondensable gases, the remainder is purged. The condensable oxidation products are resolved by distillation of the solution coming from the scrubbing column through a 90 cm. glass column packed with glass helices. For each pound of ethane consumed there was obtained 0.38 lb. ethylene oxide, 0.40 lb. formaldehyde, and 0.09 lb. acetaldehyde.

Although specific operating conditions and apparatus are described in the above example, the invention is not to be limited to those mentioned.

The proportions of oxygen, ethane and recycle gas fed to the reactor are very important. Since the recycle gas is composed essentially of $C_2$ hydrocarbons, the ratio of oxygen to the total hydrocarbon content present is low. In the example given above, the $C_2$ hydrocarbon to $O_2$ volume ratio is about 15. This comes from the high percentage of recycle gas and the use of oxygen instead of air. The mixture entering the reactor is thus essentially free from nitrogen, nitrogen compounds or other inert gases. A small but harmless amount of inert gases (such as CO, $CO_2$ and methane) are present in the recycle stream. However, these inert gases formed do not build up to any appreciable amount as a certain portion (about 10%) of the uncondensable gases are purged and a steady state concentration is thus established in the system. In a typical steady state operation the inerts in the recycle stream are maintained at about 40% (by volume), including the methane resulting from the reaction.

By maintaining the $C_2$ hydrocarbon to $O_2$ ratio at about 15 in the reactor, high yields of ethylene oxide are obtained. This ratio is achieved by feeding more hydrocarbon than the oxygen will consume in the time the mixture is in the reactor. This naturally requires the recycling of a large proportion of the uncondensable gases. Lower ratios of $C_2$ hydrocarbons to oxygen permit smaller reactors and lower recycling rates, but yield less valuable products. Higher $C_2$ hydrocarbon to oxygen ratios require a high recycle rate and an excessively large reactor. In general the higher the ratio, the more valuable is the product. Considerations of reactor size may, however, dictate ratios less than 15 (and as low as 10 in some cases) even though they give poorer yields of ethylene oxide.

The contact time is preferably adjusted so that only about 35% to 75% of the oxygen fed to the reactor is consumed during passage through the reaction zone. Since the percentage of oxygen in the gases entering the reactor is known, the measurement of the percentage of oxygen in the gases leaving the reactor serves as a convenient method of controlling the time of transit of the gases through the reactor.

The time that the gases remain in the reactor may vary from a fraction of a second to about twenty seconds, depending on the temperature. In general it may be stated that at low temperatures (below 500° C.) the contact time should be longer, and at high temperatures (above 600° C.) the contact time will be shorter. The preferred time is from one to three seconds at a temperature between about 500° C. and 600° C. Particularly excellent results have been obtained with a time of about 1.5 seconds and a temperature of 580° C.

The oxidation is carried out in the absence of any catalysts and at pressures slightly greater than atmospheric pressure, that is, from 15 p. s. i. to about 100 p. s. i. absolute.

As mentioned above, the off gases from the reactor are subjected to continuous countercurrent scrubbing or to other means of recovering the oxygenated materials. On leaving the reactor the off gases are cooled (in heat exchanger 12) to recover the useful heat. In this connection it should be pointed out that the gases are preferably not cooled below the dew point of the ethylene oxide until they are scrubbed with a buffered solution. Thus there is never present a concentrated solution of the ethylene oxide in an acid solution. In the specific example given above the cooler consists of a buffered water solution. In plant-scale operation this cooler is a heat exchanger to recover the useful heat in the gases. This heat exchanger can thus be used to preheat the recycle and make-up feed. Additionally, it is preferred that the ethylene oxide concentration in the scrubbing solution be kept low and that the pH be kept above about 5 to prevent hydrolysis of the ethylene oxide. Other buffer solutions or other means capable of producing a pH above 5 may be used in lieu of the phosphate buffer solution mentioned above.

The condensables can be recovered from the scrubber bottoms and separated by distillation. The noncondensable gases which emerge from the scrubber are divided into two streams. One is used to furnish the recycle gas with which fresh quantities of ethane and oxygen are mixed; the other stream is purged.

In large-scale operations it may be often desirable to subject the purge stream to a stripping operation to remove CO, $CO_2$ and methane while the useful hydrocarbons are returned to the reactor feed.

Since certain changes may be made in the above process without departing from the scope of the invention herein involved, it is intended that all matter contained in the above description, or shown in the accompanying drawing, shall be interpreted as illustrative and not in a limiting sense.

We claim:

1. A process for the production of ethylene oxide from ethane which comprises the steps of feeding a mixture of ethane and large quantities of recycle gas into a catalyst-free reaction zone heated to a temperature between 400° C. and 700° C., feeding with said mixture a quantity of oxygen such that said mixture contains less oxygen than ethane, said mixture having a volume ratio of $C_2$ hydrocarbons to oxygen of above 10, maintaining said gaseous mixture at a pressure slightly in excess of atmospheric pressure, said gaseous mixture being passed through said heated reaction zone for a period of time from about a fraction of a second to twenty seconds, said time being sufficient to effect consumption of only 35% to 75% of the oxygen fed to the reactor, removing hydrogen peroxide from the exit gas, separating the oxygenated hydrocarbons from the exit gas, and recycling unoxygenated hydrocarbons and unconsumed oxygen to the reactor.

2. A process for the production of ethylene oxide from ethane which comprises the steps of feeding a mixture of ethane and large quantities of recycle gas into a catalyst-free reaction zone heated to a temperature between 400° C. and 700° C., feeding with said mixture a quantity of oxygen such that said mixture contains less oxygen than ethane, said mixture having a volume ratio of $C_2$ hydrocarbons to oxygen of above 10, maintaining said gaseous mixture at a pressure slightly in excess of atmospheric pressure, said gaseous mixture being passed through said heated reaction zone for a period of time from about a fraction of a second to twenty seconds, controlling the time of passage of said gaseous mixture through the reaction zone by monitoring the residual oxygen in the outgasses and maintaining this residual oxygen at about 75% to 35% of the oxygen fed to the reaction zone, separating condensable oxygenated products including ethylene oxide and hydrogen peroxide from the exit gas, recovering ethylene oxide from the separated products, and recycling unoxygenated hydrocarbons and unconsumed oxygen to said reactor.

3. A process for the production of ethylene oxide from ethane which comprises the steps of feeding a mixture of ethane and large quantities of recycle gas into a catalyst-free reaction zone heated to a temperature between 500° C. and 600° C., feeding with said mixture a quantity of oxygen such that said mixture contains less oxygen than ethane, said mixture having a volume ratio of $C_2$ hydrocarbons to oxygen of above 10, maintaining said gaseous mixture at a pressure slightly in excess of atmospheric pressure, said gaseous mixture being passed through said heated reaction zone for a period of time from about a fraction of a second to three seconds, said time being sufficient to effect consumption of only 35% to 75% of the oxygen fed to the reaction, recovering ethylene oxide from the oxygenated hydrocarbons and hydrogen peroxide in the exit gas by cooling said exit gas to a low temperature which is above the dew point of the ethylene oxide vapors, and recycling unoxygenated hydrocarbons and unconsumed oxygen to the reactor.

4. A process for the production of ethylene oxide from the ethane which comprises the steps of feeding a mixture of ethane and large quantities of recycle gas into a catalyst-free reaction zone heated to a temperature between 400° C. and 700° C., feeding with said mixture a quantity of oxygen such that said mixture contains less oxygen than ethane, said mixture having a volume ratio of $C_2$ hydrocarbons to oxygen of above 10, maintaining said gaseous mixture at a pressure slightly in excess of atmospheric pressure, said gaseous mixture being passed through said heated reaction zone for a period of time from about a fraction of a second to twenty seconds, said time being sufficient to effect consumption of only 35% to 75% of the oxygen fed to the reactor, separating the oxygenated hydrocarbons and hydrogen peroxide from the exit gas, recovering ethylene oxide from the separated products, and recycling unoxygenated hydrocarbons and unconsumed oxygen to the reactor.

References Cited in the file of this patent

UNITED STATES PATENTS

| | | |
|---|---|---|
| 1,911,746 | Burke | May 30, 1933 |
| 1,995,991 | Lehner | Mar. 26, 1935 |
| 2,365,851 | Thomas | Dec. 26, 1944 |
| 2,416,156 | Cook | Feb. 18, 1947 |
| 2,530,509 | Cook | Nov. 21, 1950 |
| 2,700,677 | Bowen et al. | Jan. 25, 1955 |